United States Patent [19]

Collins et al.

[11] Patent Number: 4,561,609

[45] Date of Patent: Dec. 31, 1985

[54] ANTI-FRICTION AND NON-OSCILLATING SPOOL FOR BELT DRIVEN CARTRIDGE

[75] Inventors: Leslie M. Collins, White Bear Lake; Myron Zarr, St. Paul, both of Minn.

[73] Assignee: Minnesota Mining and Manufacturing Company, St. Paul, Minn.

[21] Appl. No.: 626,138

[22] Filed: Jun. 29, 1984

[51] Int. Cl.$^4$ .................. G01B 1/04; G11B 15/32
[52] U.S. Cl. .................... 242/192; 242/199
[58] Field of Search ....... 242/55.19 A, 71.8, 197–200, 242/192; 360/132, 137

[56] References Cited

U.S. PATENT DOCUMENTS

| 2,894,700 | 7/1959 | Roberts et al. | 242/198 |
| 3,692,255 | 9/1972 | Von Behren | 242/192 |
| 4,289,282 | 9/1981 | Kohno | 242/71.8 |
| 4,452,404 | 6/1984 | Gelardi et al. | 242/71.8 |

FOREIGN PATENT DOCUMENTS

| 82107172.7 | 8/1982 | European Pat. Off. |
| 3222632A1 | 5/1983 | Fed. Rep. of Germany. |
| 52-110603 | 8/1977 | Japan. |
| 52-140451 | 10/1977 | Japan. |
| 54-55959 | 4/1979 | Japan. |

OTHER PUBLICATIONS

U.S. Ser. No. 626,136 Patent Appln. filed 6/29/84—"Non-Oscillating Spool For Belt Driven Cartridge" Copending And Commonly-Assigned.

Primary Examiner—Leonard D. Christian
Attorney, Agent, or Firm—Donald M. Sell; James A. Smith; David L. Anderson

[57] ABSTRACT

A tape spool including two flanges interconnected by a hub providing a cylindrical tape winding surface is adapted for mounting on and rotation around a cylindrical pin extending from one of two spaced, parallel walls of a data cartridge by providing a bore extending through the hub and one of the flanges which closely but freely fits said pin, and a bearing protrusion extending from the other of the flanges into the bore wherein the extension of the pin from its cartridge wall is greater than the length of the bore to the bearing protrusion so that the spool is suspended above the wall for free rotation about the pin. Oscillation of the spool on the pin may be prevented by also providing a wear-button protrusion extending from the other of the flanges opposite and coaxial with the bore and a spring which extends from the remaining cartridge wall to contact the wear-button protrusion and force the spool into contact with the pin.

9 Claims, 3 Drawing Figures

ANTI-FRICTION AND NON-OSCILLATING SPOOL FOR BELT DRIVEN CARTRIDGE

BACKGROUND OF THE INVENTION

1. Field of the Invention

The present invention concerns an improved tape spool for a two-spool tape cartridge in which a flexible, elastic drive belt contacts the tape on the tape spools and whereby movement of the belt causes movement of the tape between the spools.

2. Description of the Prior Art

The belt driven tape cartridge of U.S. Pat. No. 3,692,255, issued to Von Behren and assigned to the assignee of the present invention, has been very successfully utilized to interface with computers where rapid acceleration and deceleration of the tape are required. In the cartridge there disclosed, a magnetic recording tape is convolutely wound on two tape spools and is bidirectionally driven between the spools by an endless flexible belt in frictional contact with the tape on both spools.

When the cartridge of the Von Behren patent was first marketed in 1972, its magnetic recording tape had a width of ¼ inch (6.35 mm), a thickness of 1 mil (0.025 mm), and was driven at 30 inches (762 mm) per second. Data were originally recorded on the tape at a density of 1600 flux reversals per inch (63 per mm). Current cartridges come in a variety of sizes and the recording tapes range in width from 0.150 inches (3.81 mm) to 0.250 inches (6.35 mm), may be as thin as 0.6 mil (0.015 mm), may be driven at 90 or more inches (2286 mm) per second, and data is recorded at densities of 10,000 flux reversals per inch (394 per mm) or more. In addition, data are recorded on a plurality of independent, parallel tracks, which may number in excess of 32, spaced across the width of the magnetic recording tape.

Although no problems were encountered when the cartridge was first introduced, the higher tape speeds, recording densities, and track densities have created a need for reduced rotational friction in the tape spools and improved spool positioning during winding and unwinding of the magnetic tape.

SUMMARY OF THE INVENTION

The present invention discloses a tape spool for use in a data cartridge which includes an anti-friction bearing and means for retaining the spool at a predetermined axial position with respect to the cartridge. Particularly, the tape spool is adapted for mounting on and rotation around a cylindrical pin extending a predetermined distance from one of the cartridge walls, and includes two flanges interconnected by a hub providing a cylindrical tape winding surface, a bore extending through the hub and one of the flanges and closely but freely fitting the pin, a bearing protrusion, which may be hemispherical, extending from the other of the flanges into the bore, wherein the extension of the pin from the cartridge wall is greater than the length of the hub bore to the bearing protrusion so that the spool is suspended above the cartridge wall for free rotation about the pin. Frictional contact between the cartridge and the spool is limited to the hemispherical protrusion of the flange and the end of the pin, and thus is very low.

The improved tape spool of the invention may also include a wear-button protrusion extending from the other of the flanges opposite and coaxial with the hub bore which may be contacted by a spring connected to an inner wall of the cartridge, which spring resiliently biases the spool into contact with the pin and resists axial movement of the spool. Thus the spool is maintained at a predetermined position relative to the tape cartridge and the magnetic tape, resulting in uniform winding of the magnetic tape upon the spool.

BRIEF DESCRIPTION OF THE DRAWINGS

The present invention will be more thoroughly described with reference to the accompanying drawings, wherein like numbers refer to like parts in the several views, and wherein.

DESCRIPTION OF THE PREFERRED EMBODIMENTS

Figure 1:
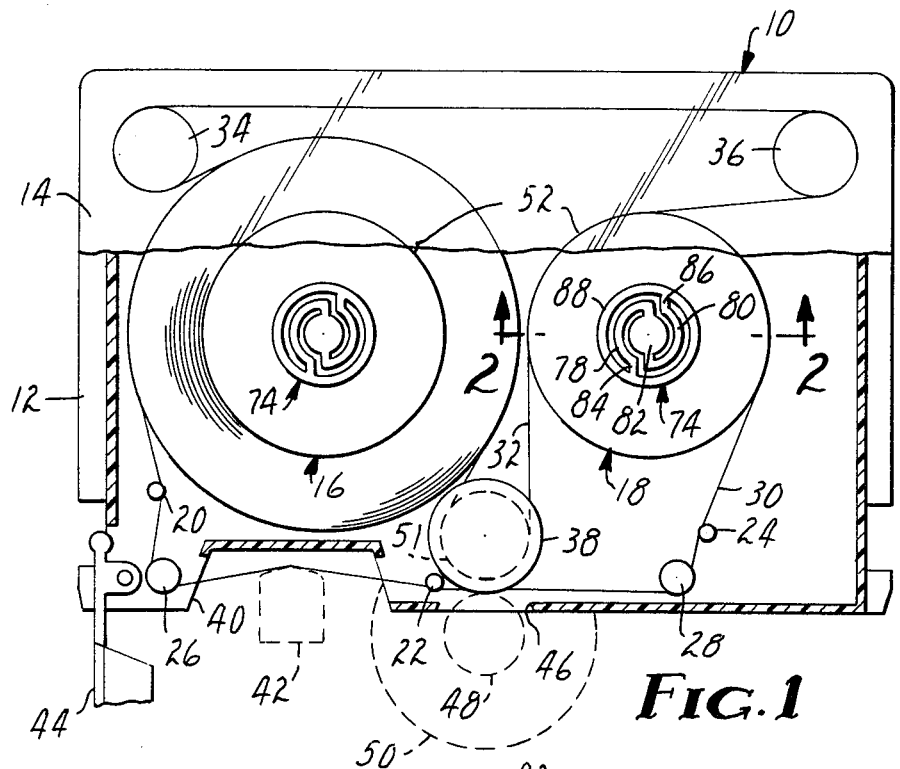
FIG. 1 is a top plan view of a belt driven tape cartridge, partially in section, containing the improved tape spool of the present invention.
Figure 2:
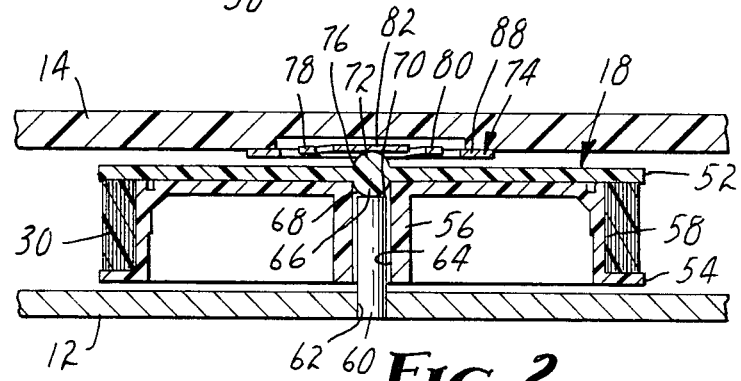
FIG. 2 is a cross-sectional view of the spool of the present invention taken generally along the line 2—2 of FIG. 1.

FIGS. 1 and 2 illustrate a data cartridge 10 of the type described in U.S. Pat. No. 3,692,255 (Von Behren) which includes a thin base plate 12, usually of aluminum, and a clear or translucent polymeric cover 14, which, when assembled, define a thin, generally rectangular enclosure. Enclosed within the data cartridge 10 are a pair of tape spools 16 and 18, three tape wrap pins 20, 22 and 24, a pair of tape guides 26 and 28, a length of magnetic recording tape 30, a driving belt 32, a pair of belt guide rollers 34 and 36, and a belt driving roller 38.

The tape spools 16 and 18 are supported by the cartridge base plate 12 for free rotation about spaced parallel axes. The magnetic recording tape 30 is convolutely wound on the tape spools 16 and 18 in opposite directions about their axes. A tape 30 guide path between the tape spools 16 and 18 is defined by the three tape wrap pins 20, 22 and 24 and the two tape guides 26 and 28.

The cartridge 10 is formed with a cutaway portion 40 along the tape path which provides access to the magnetic tape 30 by a magnetic transducer 42. The cutaway portion 40 is normally closed by a spring-loaded door 44 which is opened as shown upon insertion of the data cartridge 10 into a tape recorder (not shown). A second opening 46 is provided in the cartridge cover 14 to provide access to the belt driving roller 38 by a drive roller 48 driven by a reversible motor 50. The magnetic transducer 42, the drive roller 48, and the reversible motor 50 are illustrated in phantom lines as they form a portion of the tape recorder rather than the data cartridge 10. The cartridge belt driving roller 38 is provided with a reduced diameter 51 to prevent contact between the driving belt 32 and the magnetic recording tape 30. The driving belt 32 is thin, continuous, flexible and elastic. It has a uniform cross-sectional area and it extends around the belt driving roller 38 and the belt guide rollers 34 and 36, contacting the tape 30 on the tape spools 16 and 18.

The length of the belt 32 is less than the length of the path along which it extends so that when the belt 32 is stretched into position it will have an installed tension or pretension. The angle of wrap of the driving belt 32 at the tape spools 16 and 18 is at least 60 degrees and provides the necessary contact between the belt 32 and the tape 30 wound on the tape spools 16 and 18 to assure frictional driving of the tape 30 and the tape spools 16 and 18.

Rotation of the belt driving roller 38 in a counterclockwise direction (as viewed in FIG. 1) by the drive roller 48 causes the belt 32 to traverse its path in a counterclockwise direction and the tape 30 to move from the tape spool 18 to the tape spool 16, the tape spool 18 serving as a supply spool and the tape spool 16 serving as a take-up spool. Opposite rotation of the driving roller 38 by the drive roller 48 will cause tape to be supplied by the tape spool 16 and convolutely wound upon the tape spool 18. A predetermined frictional coupling between the belt guide rollers 34 and 36 and their respective support shafts applies a predetermined drag to the belt 32 as it passes around the guide belt rollers 34 and 36, thereby increasing the tension of the belt 32 as it passes around each of the guide rollers 34 and 36. This increased tension in the belt 32 increases the length of the belt 32 according to its elasticity and thereby the speed at which the belt 32 passes around the spool 18 is increased compared to that at which it passes around the spool 16. This increased speed causes tension in the tape 30 as well as the ability to take up any slack developed in the tape 30 between the tape spools 16 and 18 as is more fully taught in U.S. Pat. No. 3,692,255.

The improved tape spool 16 or 18 of the present invention is best illustrated in FIG. 2 and includes an upper flange 52 and a lower flange 54 interconnected by a hub 56 providing a cylindrical tape winding surface 58. The spool 16 or 18 is preferably molded of plastic with the hub 56 and lower flange 54 molded as a single unit and the upper flange 52 molded separately and attached to the hub 56 either by an adhesive or welding. The spool 16 or 18 is mounted to the cartridge 10 on and for rotation around a pin 60 which is press-fitted into a hole 62 in the cartridge plate 12 to extend a predetermined distance above the plate 12. The spool 16 or 18 is journaled for free rotation around the pin 60 by means of a bore 64 provided in the hub 56, which bore is sized to closely but freely fit the diameter of the pin 60.

To reduce rotative friction of the spool 16 of 18 about the pin 60, the upper flange 52 is provided with a bearing protuberance 66 which extends into the hub bore 64 and contacts the pin 60. The bearing protuberance 66 is preferably frusto-conical or hemispherical in shape and preferably has a rounded surface 68 which reduces the area of contact between the protuberance 66 and the pin 60. It will be recognized, however, that the protuberance 66 could simply be a cylindrical projection which contacts the pin 60 at a flat surface or the pin 60 could simply contact the flange 52. It is desirable, however, to include the bulk of material provided by the protuberance 66, rather than simply allowing the pin 60 to contact the flat, lower surface of the upper flange 52, because the upper flange 52 is molded of a polymer and may be somewhat abraded or frictionally heated by contact with the pin 60. The relatively large bulk of material provided by the protuberance 66 minimizes any damaging effects caused by such heating and the rounded shape of its surface 68 further minimizes heat caused by friction and reduces abrasion caused by the pin 60.

In order to further reduce friction and abrasion generated between the pin 60 and the bearing protuberance 66, the terminal surface 70 of the pin 60 may likewise be rounded rather than flat as illustrated. The length of the pin 60, from the surface of the cartridge plate 12 to its terminal end 70, is selected to be slightly greater than the length of the hub bore 64 from the flange 54 to the protuberance 66 so that the spool 16 or 18 is suspended by contact between the pin 60 and the protuberance 66 such that the lower flange 54 rotates free of contact with the cartridge plate 12.

Thus far a tape spool 16 and 18 has been described which will be effective to greatly reduce friction between the spool 16 or 18 and the pin 60 as the spool 16 or 18 rotates in use. If it could be assured that the data cartridge 10 would only be used at low tape speeds and that the cartridge 10 would always be oriented in an upright position such that the pin 60 were vertical, the bearing protuberance 66 would be all that was required for adequate performance since gravity could be relied upon to maintain the bearing protuberance 66 in contact with the pin 60 and prevent the spool 16 or 18 from lifting with respect to the cartridge plate 12 and oscillating on the pin 60 as tape 30 was being wound or removed. However, high speed rotation of the spools 16 and 18 may cause lifting or oscillation of the spool 16 or 18 relative to the pin 60 and imperfect convolute winding of the tape 30 upon the spool 16 or 18. Such movement of the spool 16 or 18 may cause damage to the edges of the tape 30 by contact with the flanges 52 or 54 and may be detrimental to tape guidance throughout the cartridge 10. In addition, the data cartridge 10 may be oriented in use in a position other than that shown in FIG. 2, in which case gravity would not assist in maintaining the protuberance 66 in contact with the pin 60.

To minimize lifting and oscillation of the spool 16 or 18 relative to the pin 60, the upper flange 52 is further provided with a wear-button protuberance 72 extending from the flange 52 opposite and coaxial with the hub bore 64. The cartridge cover 14 is provided with a spring 74 which contacts the wear-button protuberance 74 and urges the bearing protuberance 66 into contact with the pin 60. Although it might be possible to eliminate the spring 74 and allow the wear-button protuberance 74 to bear directly against the cover 14, such an arrangement would be difficult to achieve because tolerances would have to be controlled tightly and either a lack of contact between the cover 14 and the spool 16 or 18 or excessive pressure between the cover 14 and the spool 16 or 18 would likely exist. The spring 74 is, therefore, provided to provide resiliency and a limited amount of travel to compensate for tolerance variations in the length of the pin 60 and the manufacture of the upper flange 52.

The wear-button protuberance 72 is provided to prevent contact between the upper flange 52 and the cartridge cover 14 or the spring 74. The preferred shape of the wear-button protuberance 72 is frusto-conical or hemispherical and either shape preferably includes a rounded outer surface 76 to minimize the area of contact between the protuberance 72 and the spring 74.

The preferred type of spring 74 is illustrated in FIGS. 1 and 2 and consists of double-cantilever spring arms 78 and 80 extending between a central, circular spool-contacting area 82 and diametrically opposed areas 84 and 86 of a spring mounted ring 88, which ring 88 is suitably attached to the cartridge cover 14.

The spring arms 78 and 80 are preferably wound in a flat helix to increase the length of the arms 78 and 80 and thus the resilient travel of the spring 74.

Figure 3:
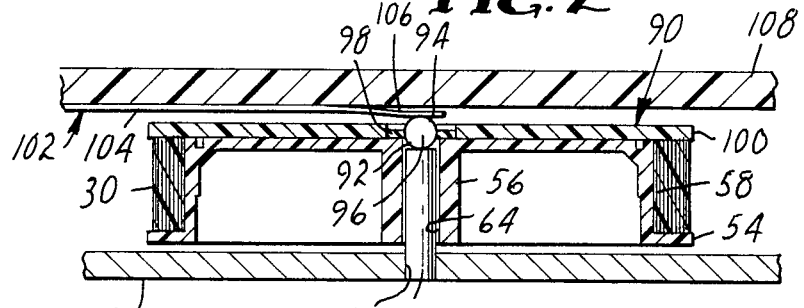
FIG. 3 is an alternate embodiment of a tape spool for use in the cartridge of FIG. 1.

FIG. 3 illustrates an alternate embodiment of a tape spool 90 according to the present invention in which a bearing protuberance 92 and wear-button protuberance 94 are provided as opposite sides of a spherical ball 96 which is press-fitted, adhesively attached, or welded to a collar 98 which is in turn attached to the upper flange 100 of the spool 90 by an adhesive, welding or press-fitting. The sphere 96 and collar 98 may also be machined or molded as an integral unit of metal or plastic or the collar 98 may be eliminated and the sphere 96 pressed or otherwise attached to the upper flange 100 by means of a hole in the flange 100 closely fitting the sphere.

Although the arrangement of FIG. 3 requires a greater number of separate pieces and greater assembly than does the arrangement of FIG. 2, the arrangement illustrated by FIG. 3 may be advantageous in that the sphere 96 which provides the bearing and wear-button protuberances 92 and 94 need not be of the same material used to produce the upper flange 100. Thus the sphere 96 may be manufactured of a highly abrasion-resistant material, such as metal, acetal resin or polycarbonate, while the upper flange 100 is manufactured of a softer but more economical material such as acrylonitrilebutadiene-styrene copolymer or high-impact polystyrene. FIG. 3 also illustrates an alternative to the spring 74 of FIG. 2 by providing a straight leaf spring 102 which includes a mounting portion 104 and spring arms 106 (only one is shown) which extend from opposite ends of the mounting portion 104 to contact each of the spools 16 and 18. The mounting portion 104 of the spring 102 may be attached to the cartridge cover 108 by any suitable method, but preferably is riveted thereto. It will be recognized that the leaf spring 102 of FIG. 3 could be used in conjunction with the spool 18 of FIGS. 1 and 2.

Either of the alternate embodiments described herein is effective to greatly reduce friction between the rotating spool and its mounting pin and also to prevent oscillation of the spool relative to the pin. Although only two embodiments have been illustrated, it will be apparent to those skilled in the art that many modifications are possible. All of such modifications which fall within the spirit and scope of the appended claims are intended to be included in the present invention.

We claim:

1. A tape spool in combination with a tape cartridge having two spaced, parallel walls and a cylindrical pin extending from one of said walls, said spool including two flanges interconnected by a hub providing a cylindrical tape winding surface, said spool further comprising:
   a bore extending through said hub and one of said flanges and closely but freely fitting said pin;
   a wear-button protrusion extending from the other of said flanges opposite and coaxial with said bore;
   a bearing protrusion extending from said other of said flanges and into said bore; and
   means for urging said bearing protrusion into contact with said pin;
   wherein the extension of said pin from said one of said walls is greater than the length of said bore to said bearing protrusion so that said spool is suspended above and may rotate free of contact with said one wall.

2. A tape spool according to claim 1 wherein said means for urging said bearing protrusion into contact with said pin is a spring attached to the other of said cartridge walls and contacting said wear-button protrusion.

3. A tape spool according to claim 2 wherein said protrusions include rounded surfaces to minimize the area of contact between said protrusions and said pin and said spring.

4. A tape spool according to claim 3 wherein said protrusions are hemispherical.

5. A tape spool according to claim 1 wherein said other of said flanges includes a hole coaxial with said bore and wherein said protrusions are opposite halves of a sphere mounted in said flange hole.

6. A tape spool according to claim 5 wherein said sphere is a material different from that of said other of said flanges.

7. A tape spool according to claim 6 wherein said sphere is metal.

8. A tape spool according to claim 6 wherein said sphere is an abrasion-resistant polymer.

9. A tape spool according to claim 8 wherein said sphere is acetal resin or polycarbonate.

* * * * *